April 15, 1941.  R. C. WALTON  2,238,785
APPARATUS FOR PRODUCING SHAPED CORES
Filed Dec. 5, 1938    2 Sheets-Sheet 1
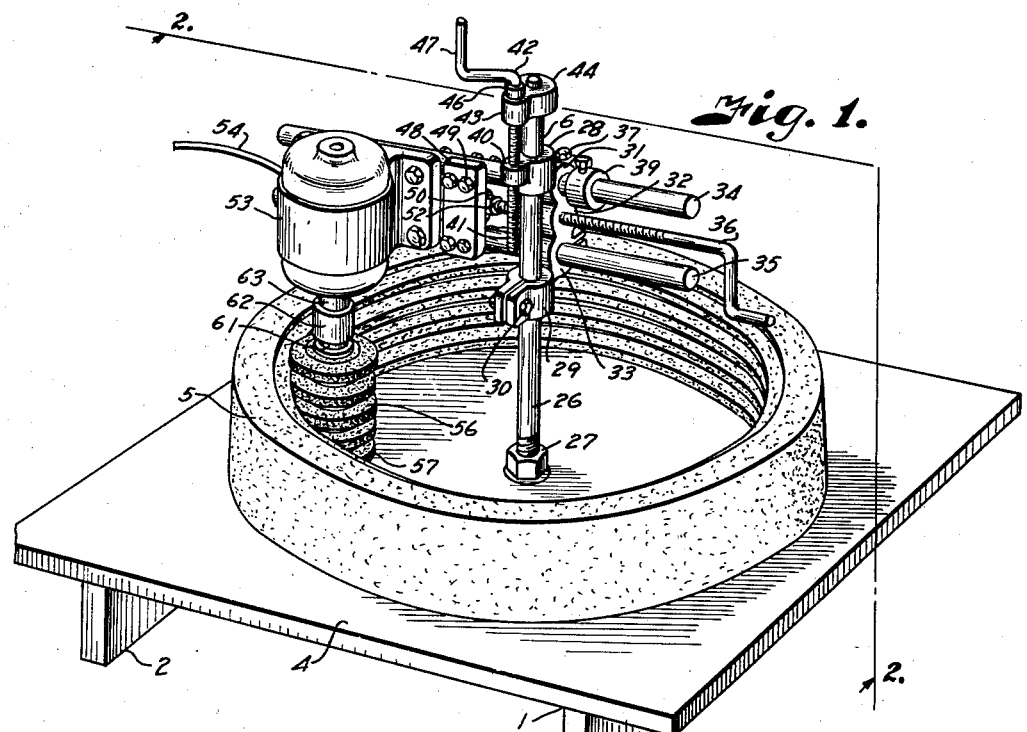
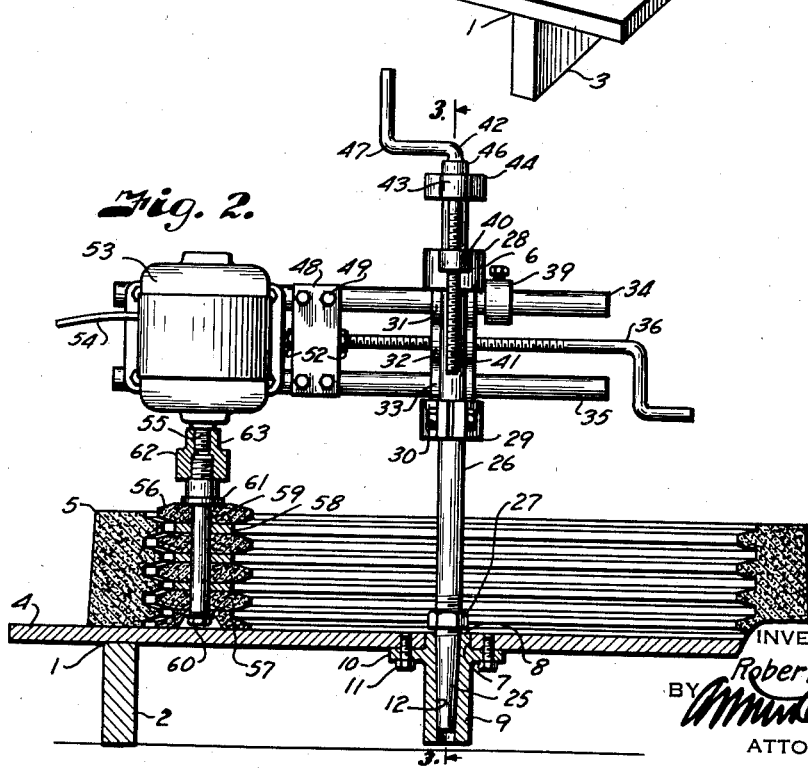
INVENTOR
Robert C. Walton
BY
ATTORNEY April 15, 1941.　　　　R. C. WALTON　　　　2,238,785
APPARATUS FOR PRODUCING SHAPED CORES
Filed Dec. 5, 1938　　　　2 Sheets-Sheet 2
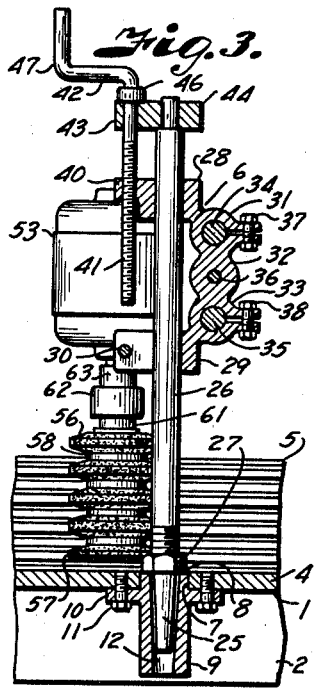
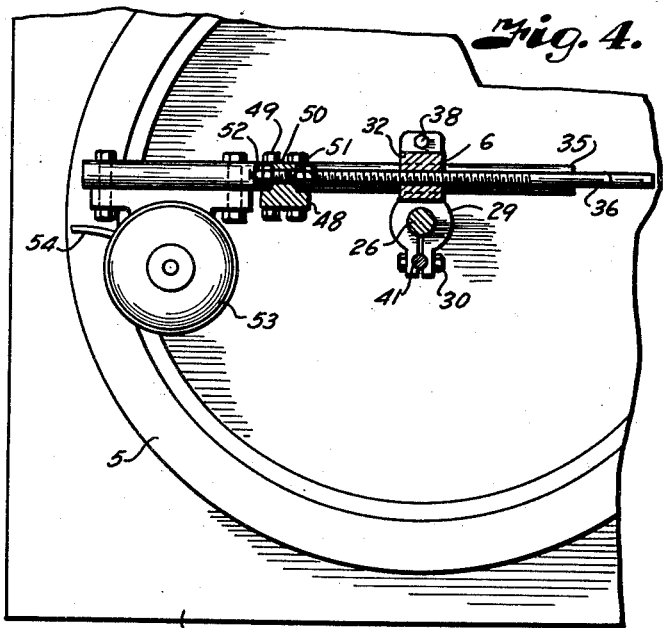
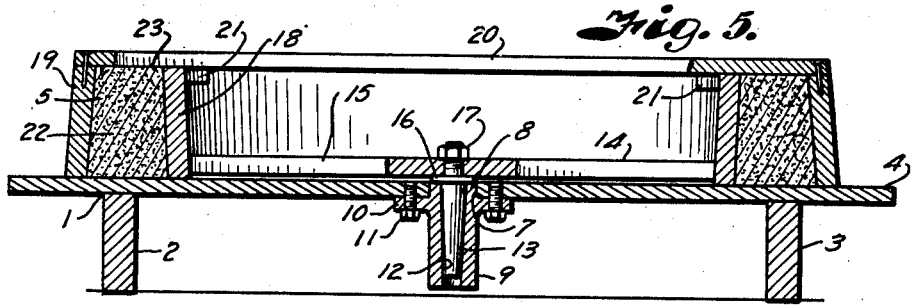
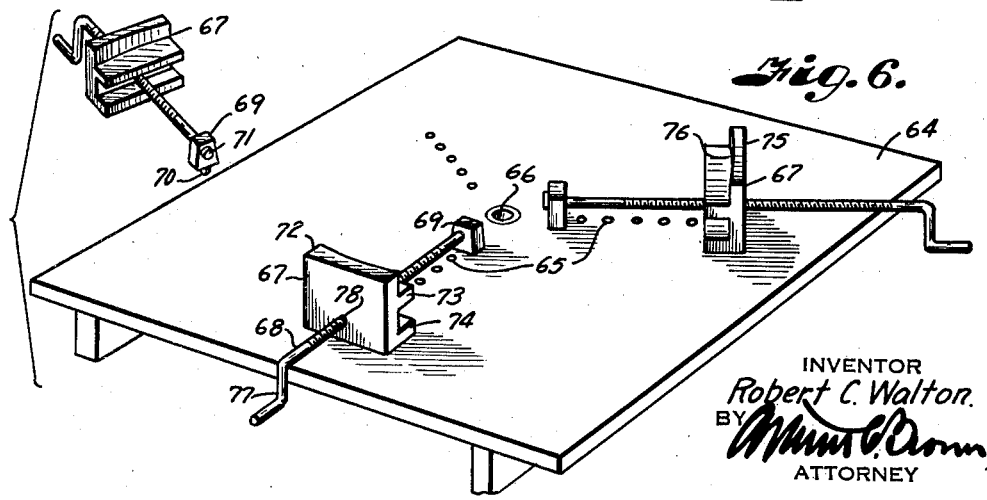
INVENTOR
Robert C. Walton.
BY
ATTORNEY Patented Apr. 15, 1941

2,238,785

UNITED STATES PATENT OFFICE 2,238,785

APPARATUS FOR PRODUCING SHAPED CORES

Robert C. Walton, Iola, Kans.

Application December 5, 1938, Serial No. 244,077

1 Claim. (Cl. 22—24)

This invention relates to an apparatus for producing shaped mold parts and more particularly to the production of mold parts used in casting grooved pulleys and similar castings.

The principal object of the present invention is to provide for quickly, economically and accurately forming mold parts used in making castings.

Other objects of the present invention are to provide improved apparatus for treating and shaping the mold parts; to provide for application of the apparatus to the mold parts in adjustable vertical and horizontal relation to the mold parts; to provide for removal of the apparatus from place to place for treating a number of mold parts; to provide for setting the apparatus to produce uniformly shaped mold parts; to provide for forming mold parts and treating the same without moving the mold parts; to provide for treating mold parts of various sizes with the same equipment; and to provide improved parts and arrangements of parts in an apparatus in accordance with this invention.

In accomplishing these and other objects of the present invention, I have provided improved details of structure, the preferred form of apparatus being illustrated in the accompanying drawings, wherein:

Fig. 1 is a perspective view of a mold part plate, mold part and apparatus in suitably juxtaposed relation for carrying out the present invention.

Fig. 2 is a vertical cross-sectional view through the mold part plate, mold part and grinding elements of the mold part treating apparatus, substantially on the line 2—2, Fig. 1.

Fig. 3 is a detail vertical cross-sectional view through the mold part plate and apparatus substantially on the line 3—3, Fig. 2, and particularly illustrating the manner of adjustment of the grinding elements relative to the mold part.

Fig. 4 is a detail plan view of the device shown in Figs. 1 to 3, parts of the mold part treating apparatus being shown in horizontal section to more clearly illustrate their construction.

Fig. 5 is a detail vertical cross-section through a mold part plate, mold part and box, particularly illustrating the manner of forming a mold part to be treated in accordance with this invention.

Fig. 6 is a detail perspective view of a mold part plate adapted for removably supporting a mold part to be treated and an apparatus for treating the mold part in accordance with this invention.

Referring more in detail to the drawings:

1, Fig. 1, designates a mold part plate which is sometimes referred to in the trade as a core plate, and hereinafter referred to as such, consisting of sills 2 and 3 supporting a floor 4, base or the like, the plate as a unit supporting a mold part 5 sometimes referred to in the trade as a core and hereinafter referred to as such, the core being shown undergoing treatment by the apparatus generally designated 6 to produce a treated and shaped core in accordance with the present invention.

The core 5 is preferably preformed, for example in the manner particularly illustrated in Fig. 5, wherein the floor of the plate is provided with a socket 7 seating the upper end 8 of a bearing 9 having a flange 10 held against the underside of the core plate floor by fastening devices 11 fixed to the flange and to the floor. The bearing 9 is preferably provided with a long tapered bore 12 for receiving a long tapered pin 13 to the upper end of which are secured spoke members 14 and 15, a washer 16 and nut 17 preferably being employed to retain the spoke members in desired radially extending position relative to the pin 13. A ring 18 having an outer periphery corresponding in diameter to the inner diameter of core to be produced, is mounted on the core plate in concentric relation to the pin and engaged with the outer ends of the spoke members. An outer ring 19 having an inner periphery corresponding in diameter to the outer diameter of core to be produced, is mounted on the core plate in spaced concentric relation to the inner ring 18. A bar 20 is fixed to the upper edge of the outer ring 19 in transverse relation thereto, the bar 20 engaging over and resting upon the inner ring 18 and being provided with blocks 21 on the bottom face of the bar engageable with the upper inner periphery of the inner ring 18 to form a rigid core box for receiving core sand treated to form a core mix or the like 22. The mix is applied to the interior of the box through the open upper end 23 thereof in a suitable manner and in sufficient quantities to form a core of suitable size and consistency. The sand 22 is then suitably packed and the core box including the spoke members and pin, are removed from the shaped sand mix, whereupon the core plate may be placed in an oven to bake the sand mix and form a core prepared and conditioned for treatment and shaping, as later to be described.

When the core has been baked sufficiently to withstand the cutting action of grinding wheels, it may be removed from the oven, and the apparatus 6 may be applied to the core plate by mounting the long tapered pin 25, Fig. 3, on the shaft 26 in the long tapered bearing 9. The effect produced by the interengagement of the long tapers of the pin 25 and bearing 9 is that of a secure lock and it is sometimes difficult to remove the pin from the bearing. The shaft is therefore preferably threaded and provided with a nut 27 which may be turned down into engagement with the upper end 8 of the bearing 9 to lift the pin and loosen it relative to the bearing as shown in Fig. 3. The shaft 26 is preferably arranged perpendicularly to the horizontal plane of the core plate and forms the principal support for the core grinding or cutting apparatus.

28 and 29, Figs. 1, 2 and 3, designate collars having bores whereby the collars may be sleeved over the shaft 26, the lower collar 29 preferably being split and provided with a locking device 30, Fig. 1, whereby the collars may be secured to prevent wobbling and lateral play on the shaft 26.

Fixed to and positioned between the collars 28 and 29 in projecting relation to one side thereof, is a plurality of transverse collars 31, 32 and 33 preferably integral with each other and with the collars 28 and 29 to form a rotatable unit head on the shaft 26. The collars 31 and 33 have bores adapted to slidably receive rods 34 and 35, and the bore in the collar 32 being adapted to screw-threadedly receive an adjusting rod 36. The collars 31 and 33 are preferably split and provided with locking members 37 and 38 to limit the freedom of sliding movement of the rods 34 and 35 in those collars and prevent wobbling or play therebetween. As shown in Fig. 1, the rod 34 may be provided with a stop collar 39 provided with a set screw or other suitable setting device, by which the collar may be fixed to the rod in such a manner as to engage the collar 31 when the adjusting rod 36 is manipulated to move the rods 34 and 35 to the left, for example, relative to Fig. 1.

In order to rotatably support the unit head on the shaft 26 and to provide for adjusting the same vertically relative to the core and to the shaft, the upper collar 28 is provided with a boss 40 through which a threaded bore passes for receiving the threaded end 41 of an adjusting member 42 to vertically space the collars 28 and 29 relative to the core and core plate in response to manipulation of the adjusting member 42.

The upper end of the adjusting member 42 passes through a bore in a boss 43 extending from a collar 44 having a bore which passes the collar over the reduced upper end of the shaft 26, the collar seating on the shoulder formed by the reduction of the shaft and forming a rotatable support for the unit head. The upper end of the adjusting member has a collar 46 thereon seating on the boss 43 and a handle or other control member 47 projects from the adjusting member above the collar to facilitate manipulation of the member. It is apparent that when the member 42 is turned in one direction, the unit head is raised, and, when turned in another direction, it is lowered.

48, Figs. 1 and 2, designates a plate having its opposite ends fixed to the rods 34 and 35 as by fastening devices 49, the plate having a boss 50, Figs. 1 and 4, extending inwardly therefrom between the rods 34 and 35, the boss being provided with a bore 51 to rotatably receive the end of the rod 36 opposite the handle or control end thereof. Nuts 52 are threaded on the rod 36 and form stops on each side of the boss 50, it being apparent that as the handle is manipulated, the rod 36 is threaded through the collar 32 and the stops 52 move the rods 34 and 35 to the left or to the right relative to Fig. 1, depending upon the direction of rotation of the rod 36.

Mounted on the rod 34 and 35 adjacent the plate 48 is a motor housing 53 having a suitable energizing connection 54 for actuating a motor in the motor housing, the motor being provided with a drive shaft 55 extending downwardly from the motor in parallel relation to the shaft 26 and in perpendicular relation to the core plate 1. A plurality of treating elements such as grinding wheels 56 and 57 are mounted below the drive shaft of the motor to rotate therewith. The grinding wheels 56 are preferably duplicates and may be in the form of emery wheels spaced from each other a suitable distance by washers 58, Fig. 2. The grinding wheel 57 may be of suitable conformation to form a finishing element when treating a core in accordance with this invention. The grinding wheels 56 and 57 are preferably mounted on a mandrel 59 and secured in position by a lock nut 60 and a collar 61, the end of the mandrel 59 preferably having threaded engagement with a collar 62, the upper reduced end 63 of which threadedly engages the lower threaded end of the shaft 55 of the motor.

The core formed as illustrated in Fig. 5 having been suitably baked, removed from the oven, and placed on the core plate in concentric relation to the socket in the core plate, the grinding apparatus may be applied by inserting the pin 25 in the bearing 9, it being apparent that the rod 36 may be manipulated to withdraw the grinding wheels toward the shaft 26 of the apparatus to assure passage of the grinding wheels within the inner periphery of the core.

When the grinding wheels have been adjusted vertically relative to the core by manipulation of the adjusting member 42, the depth of groove to be formed in the core is determined, and the rod 36 is manipulated to move the grinding wheels horizontally into engagement with the inner periphery of the core. The collar 39 is then set to limit grinding action of the wheels on the core, and the motor is then started. The grinding wheels rotate in response to energization of the motor and cut into the inner periphery of the core. The motor may be turned or swung in an arc within the periphery of the core and may be moved outwardly relative to the shaft 26 by manipulation of the rod 36 until such time as the collar 39 engages the head 31, the grinding wheels meanwhile forming grooves in the core of a character depending upon the shape of the wheels, and their spacing relative to each other.

The grooves having been formed in the core, the rod 36 is manipulated to withdraw the wheels from the grooves, whereupon the shaft 26 may be removed from the bearing to allow removal of the core from the core plate. The core is then applied in a suitable manner to a mold or previously prepared flask to form the outer portion of a casting such as a V-belt pulley.

It is sometimes desirable to provide core plates of uniform size, regardless of the size of cores to be treated. To this end, a core plate 64, illustrated in Fig. 6, is provided with spaced series of aligned apertures 65 therein radially disposed around a center socket 66 in the bore. Core aligning elements 67 are also provided, which preferably consist of rods 68 or the like having blocks 69 on their inner ends, the blocks being provided with pins 70 on their lower faces, which are engageable in the apertures 65 in the core plate. The inner ends of the rods 68 are rotatably mounted in the blocks 69, the blocks being held from displacement relative to the rods by stop members 71 on their inner ends.

72 designates one of a plurality of supporting members each consisting of a block having spaced upper and lower ledges 73 and 74, the upper ledge 73 being adapted to receive and support the outer lower edges of a core. The upper end 75 of the block extends above the ledge 73 and is arcuately shaped as at 76 adapting it for engagement with the outer periphery of a core resting on the ledge 73 of the supporting member.

77 designates a handle or controlling element for the rods, which, when turned, rotates the rods to move the supporting members 72 to and from the blocks 69 due to threaded engagement of the rods 68 in threaded bores 78 of the supporting members.

A core having been prepared in the manner illustrated in Fig. 5 and it being desired to treat the core in accordance with this invention to produce a mold suitable for forming the outer portion of the casting of a V-belt or like pulley, the core may be removed from its baking core plate and placed on the ledges 73 of the supporting members, the supporting members being adjusted by the handles 77 on the rods in such a manner as to effect engagement of the arcuate surfaces of the supporting members with the outer periphery of the core. In this manner, the core may be concentrically arranged about the socket in the core plate and the grinding apparatus may then be applied to the plate within the core substantially in the manner previously described. The grinding wheels of the apparatus may then be adjusted horizontally and vertically relative to the core, whereupon the motor may be energized to cause the wheels to cut grooves to a predetermined depth in the inner periphery of the core. The core may then be used in a mold or flask to form the outline or contours of a casting of the character referred to.

What I claim and desire to secure by Letters Patent is:

In apparatus of the character described, a core plate consisting of a floor having a socket and spaced series of aligned apertures arranged concentrically relative to the socket, rods having blocks at one end thereof provided with pins engageable in said apertures, ledged supports adjustably mounted on said rods for receiving and supporting a core thereon in spaced relation to the core plate and to center the core relative to said socket in response to adjustment of said ledged supports, and grinding apparatus mounted in said socket and movably engageable with a core on said ledged supports to shape the same.

ROBERT C. WALTON.